United States Patent [19]

Wichterle

[11] Patent Number: 4,519,681

[45] Date of Patent: May 28, 1985

[54] SOFT LENTICULAR CONTACT LENS WITH NEGATIVE REFRACTION

[75] Inventor: Otto Wichterle, Prague, Czechoslovakia

[73] Assignee: Ceskoslovenska Adademie Ved, Prague, Czechoslovakia

[21] Appl. No.: 343,510

[22] Filed: Jan. 28, 1982

[30] Foreign Application Priority Data

Feb. 2, 1981 [CS] Czechoslovakia ................. 764-81

[51] Int. Cl.³ .............................................. G02C 7/04
[52] U.S. Cl. ............................................... 351/160 H
[58] Field of Search ............... 351/160 H, 160 R, 161, 351/162

[56] References Cited

U.S. PATENT DOCUMENTS

T256,369  3/1981  Wichterle ................. 351/160 H
4,239,353  12/1980  Koller ...................... 351/160 H Primary Examiner—John K. Corbin
Assistant Examiner—Scott J. Sugarman
Attorney, Agent, or Firm—Murray Schaffer

[57] ABSTRACT

A soft lenticular contact lens having negative refraction is provided having an outer convex surface comprising a central curved optical zone and a circumferential curved ring linked together by a conic surface, the conic surface passing tangentially into the circumferential curved ring.

7 Claims, 3 Drawing Figures

SOFT LENTICULAR CONTACT LENS WITH NEGATIVE REFRACTION

The invention pertains to a soft lenticular contact lens having negative refraction, the outer convex surface of which contains at least two curved surfaces.

Known lenses having negative refraction, particularly lenses with a strong negative refraction, are shaped "lenticularly", i.e. their central optical zone is formed with the corresponding difference of the inner and outer curvature radii, while the increased thickness of the lens at the circumference of the optical zone is reduced by a surface of larger curvature. As a rule, both of these zones on the outer surfaces of the lens, which are linked to one another, are for technological reasons spherical. It is obvious at the same time, that it was necessary to change or vary the shape of the spherical or in another way curved peripheral ring, according to the dioptric strength of the lens, with respect to the considerably varying thickness of lens at the circumference of optical zone. With strongly negative lenses, the flattening of the optical zone appears in the lens thickness as far as to its very circumference if the transition from the circumference of optical zone to the lens circumference is realized by the recent method, i.e. by a spherical surface at the peripheral zone. Similarly, the transition from differently curved optical zones is again marked with a dramatic change of thickness extending to the very circumference of lens, such as if the surfaces all curved in another way, e.g. ellipsoidal peripheral surfaces.

The design of the peripheral part of the lens is of substantial importance only for the mechanical interaction of lens with an eye, because it forms a supporting corset at the strongly aspherical conjunctival part of the eye and is responsible for the centering mechanism of the lens. Also, the pressure of the circumferential part of the lens, which may unfavorably limit blood supply to the eye tissues, strongly depends on the thickness profile of the lens in its peripheral zone. The mechanical behaviour of lenses on the eye is, therefore, highly dependent on the degree of refraction with the recently used sets of lenses of various negative refraction. The strongly increased thickness of the peripheral ring, in lenses of strongly negative refraction, thus has unfavorable effects on the metabolism of eye tissues under the contact lenses. The adverse effects depend to a considerable extent on the mean thickness of the lens, determined above all by the lens thickness in its prevailing part, i.e. in its peripheral ring.

The design of a lens according to the present invention substantially reduces the above shortcomings, and, at the same time, unifies the lenses even at the largest span of their optics.

SUMMARY OF THE INVENTION

According to the present invention a soft lenticular contact lens having negative refraction is provided having an outer convex surface comprising a central curved optical zone and a circumferential curved ring linked together by a conic surface, the conic surface passing tangentially into the circumferential curved ring.

The central curved surface and/or the circumferential curved ring are advantageously spherical surfaces. The circumferential curved ring preferably has its thickness, which is uniform, within the limits 20% and is larger than 0.05 mm and smaller than 0.3 mm. The curvature of the circumferential ring is constant for all of the lenses of a given type independently of the refraction of its central curved surface. The edge between the central curved surface and the conic surface is preferably rounded off.

This arrangement avoids most of the disadvantages connected with the recent design of negative lenticular contact lenses. The increase of lens thickness, which is necessary to achieve a negative refraction, is here limited only to the relatively narrow central zone of the lens, while the extensive circumferential part of the lens remains as thin as with the lenses of very low refraction or with lenticular lenses of strong positive refraction.

The transition from the central optical zone to the interposed conic surface is somewhat sharper than in recent designs, where this transition would pass into the neighboring curved surface. It might be presumed, that the sharper edge will irritate the eyelid which goes over this edge at each wink. However, it has turned out that the eyelid does not perceive this edge even if the strongest refractions are concerned, and that this effect is entirely eliminated by rounding off this edge. Such rounding only reduces the optical zone by a negligible fraction.

The soft lenticular contact lens according to the invention may be advantageously used in a set of lenses of the described new design, where all lenses coincide in thickness and have a shape of circumferentially two sided curved thin-walled ring even at refractions ranging from zero to $-22$ diopters. This similarity brings on an important effect, i.e. a pratical coincidence in the mechanical interaction with an eye of given shape, irrespective of the variety of negative refraction. This extraordinarily facilitates a selection of a mechanically optimal lens, according to the measured shape of the patient's eye. At this arrangement and at such selection, the lenses can be unambiguously standardized into a small number of shape types differing in the main only by the ratio of sagittal depth to the lens diameter.

Practical realization of this invention is possible by application of any known technology producing soft contact lenses. But this new design may be introduced in particular easily, also in a large production scale, into the highly effective methods of rotation spin-casting in opened molds or by static casting in elastic closed molds.

Further description elucidates the invention more closely by means of a diagrammatic drawing and an example of real performance.

DESCRIPTION OF THE INVENTION

The outer convex surface of a soft contact lens according to the invention is formed with a central curved surface A (a lenticule) (FIG. 1) and by a circumferential curved ring B at its outer peripheral edge which are linked together by a conic surface C in such a way that no edge arises between the circumferential curved ring B and the conic surface C, because both these surfaces are linked tangentially, i.e. by equal slopes. The edge arising between the central curved surface A and the conic surface C is rounded off.

Figure 1:
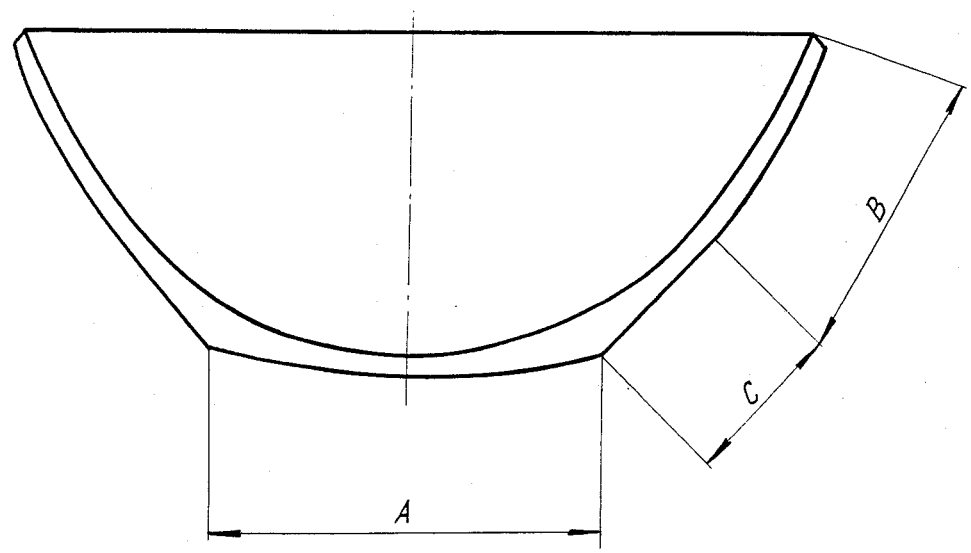
FIG. 1 is a schematic cross section of a contact lens embodying the invention.
Figure 2:
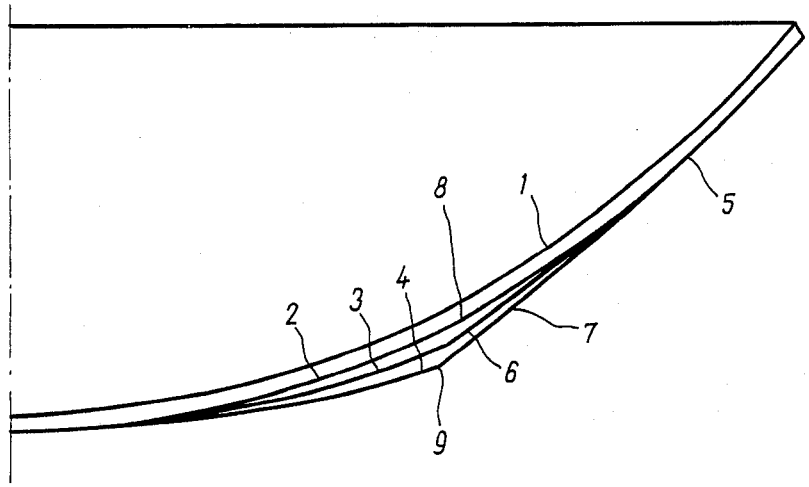
FIG. 2 is half an axial sectional view through the contact lens showing three various refractions.

FIG. 2 displays, in parallel, three lenses of various refraction designed according to the invention. The curve 1 marks a section through the inner surface of the lens, which is identical for all three lenses. The curves 2, 3 and 4 belong to three differently curved and, consequently, differently defracting surfaces of the central curved surface A (FIG. 1). The curve 5 indicates the shape of the outer circumferential curved ring B, which perfectly coincides for all three lenses. The straight lines 6 and 7 belong to the conic surfaces which link both curved surfaces A and B. The curve 8 represents the surface of a nonlenticular lens, which has a continuous shape over the whole outer surface of the lens and is the limiting case of lenticular surfaces coinciding with the described lenticular surfaces only in the circumferential curved ring. The straight lines 6 and 7 pass smoothly into the curve 5 and are thus the slope lines of curve 5 at the contact site.

The edge 9 between the central curved surface A and the conic surfaces C is preferably rounded off.

Figure 3:
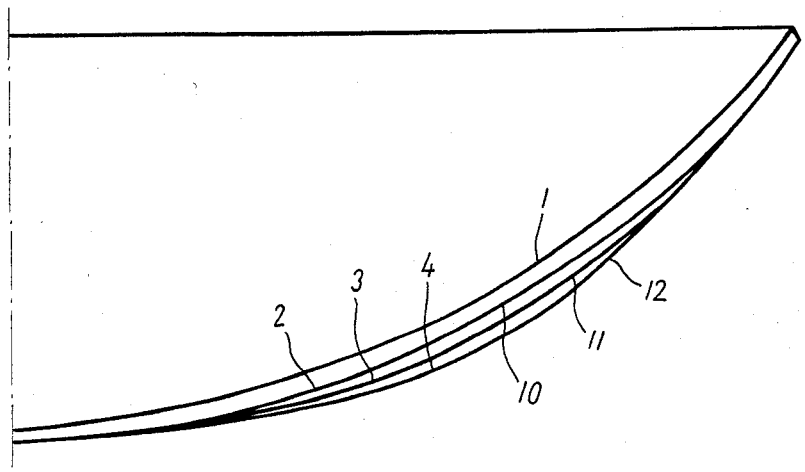
FIG. 3 is half an axial sectional view showing three various refractions as in FIG. 2, but formed in accord with the known recent prior art method, being presented only for the sake of comparison.

FIG. 3 shows, for the sake of comparison, three lenticular lenses designed by a recent prior art method and which coincide with the lenses according to FIG. 2 only in the central curved surfaces (curves 2, 3, 4). On the other hand the link transition areas between the central curved surface and the peripherical edge are of different shape (curves 10, 11, 12) as far as to the outer edge of the lens. The curve 10, which belongs to the limiting nonlenticular type of lens is identical indeed with the curve 8 in FIG. 2.

A great difference in the thickness profile of the circumferential curved ring for various strong refractions of optical zones is obvious from FIG. 3. This is a substantial difference as compared to the optically analogous lenses according to the invention, which are shown in FIG. 2 and which have the unified circumferential zone irrespective of the optical strength of the lens.

EXAMPLE

A set of lenses made of the soft water swollen hydrophilic gel (copolymer of hydroxyethyl methacrylate and ethylene dimethacrylate) was designed so that all of the lenses had a circumferential ring precisely corresponding to a nonlenticular lens of diameter 14.1 mm. The inner surface was an ellipsoid of eccentricity 0.6 and a central radius 7.6 while the outer surface was an ellipsoid of the same eccentricity but of a central radius 7.8. The central thickness of this nonlenticular lens of refraction −1.7 diopters forms the limit of this set of lenses. The lenses in the set, which have stronger negative refraction, are designed lenticularly in such a way that the spherical central surface always reaches at least to a diameter of 8 mm and continues with a conic surface tangentially linked to the circumferential ring. Thus, for example, a lens of a refraction of 6.1 diopters has the optical zone of a radius 8.5 mm, and continues behind the diameter 8 mm with a cone, which surface line includes an angle 54.7 with the lens axis and which continuously passes into the circumferential ring having a diameter 9.6 mm. A lens of refraction 14.5 mm has a radius of 10.17 mm in the central optical zone, continues behind the diameter of 8 mm with a cone, which surface line includes an angle 49.5 with the lens axis and which passes into the circumferential ring of diameter 11 mm. Other lenses of the set were similarly designed. If the lenses are applied on the eyes of the same shape, type, i.e. on eyes with spherical caps of diameter 14.1 mm and practically coincidental volume and sagittal height, they exhibit very similar mechanical interaction with the eye. This highly facilitates their optimal selection in contrast to lenses which circumferential ring has the thickness strongly depending on the degree of refraction.

I claim:

1. A soft lenticular contact lens with negative refraction, wherein the outer convex surface comprises a central curved surface (A) and a circumferential curved ring (B), said central surface and said curved ring being linked together by a conic surface (C), tangentially passing into the circumferential curved ring (B).

2. The soft lenticular contact lens according to claim 1, wherein the central curved surface (A) is a spherical surface.

3. The soft lenticular contact lens according to claim 1, wherein the circumferential curved ring (B) has, a substantially uniform thickness within ±20%, said thickness being larger than 0.05 mm and smaller than 0.3 mm and the curvature of said circumferential curved ring being constant for the given type of lenses independently of the refraction of the central curved surface (A).

4. The soft lenticular contact lens according to claim 1, wherein the edge between the central curved surface (A) and the conic surface (C) is rounded off.

5. The soft lenticular contact lens according to claim 1, wherein the circumferential ring (B) is a spherical surface.

6. The soft lenticular contact lens according to claim 1, wherein the central curved surface (A) and the circumferential ring (B) are spherical surfaces.

7. A soft lenticular contact lens having a negative refraction comprising a body having an inner concave spherical surface and an outer convex surface, said outer convex surface having a circular central optical zone, a ring section about its peripheral edge and an annular conical section interconnecting said central zone and said peripheral ring section, the outer surfaces of said optical zone and said annular peripheral ring section being convexly curved, and said conical section passes tangentially into said peripheral ring section.

* * * * *